United States Patent
Wang et al.

(10) Patent No.: US 7,760,749 B2
(45) Date of Patent: Jul. 20, 2010

(54) APPARATUS AND METHOD FOR DESKEWING 1000 BASE-T ETHERNET PHYSICAL LAYER SIGNALS

(75) Inventors: Chih-Chi Wang, Taipei (TW); Yi-Hua Lai, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 829 days.

(21) Appl. No.: 11/622,034

(22) Filed: Jan. 11, 2007

(65) Prior Publication Data

US 2008/0170582 A1 Jul. 17, 2008

(51) Int. Cl.
*H04L 12/56* (2006.01)
(52) U.S. Cl. ...................................... 370/412; 370/419
(58) Field of Classification Search ........................ None
See application file for complete search history.

(56) References Cited

U.S. PATENT DOCUMENTS

| | | | |
|---|---|---|---|
| 6,738,935 B1 * | 5/2004 | Kimmitt | 714/701 |
| 7,242,736 B2 * | 7/2007 | Schanke et al. | 375/372 |
| 7,454,537 B1 * | 11/2008 | Xue | 710/52 |
| 2008/0130814 A1 * | 6/2008 | Li et al. | 375/372 |

* cited by examiner

*Primary Examiner*—Jayanti K Patel
*Assistant Examiner*—Anthony Sol
(74) *Attorney, Agent, or Firm*—Thomas, Kayden, Horstemeyer & Risley

(57) ABSTRACT

The invention provides an Ethernet physical layer (PHY) receiver. Ethernet PHY signals are simultaneously transmitted through first, second, third, and fourth duplex channels. The Ethernet physical layer receiver comprises a deskew first-in first-out (FIFO) module and a deskew control module. The deskew FIFO module includes four deskew FIFO buffers for respectively holding the Ethernet PHY signals of the duplex channels, wherein the Ethernet PHY signals of the duplex channels are respectively retrieved from the deskew FIFO buffers for further processing through read points of the deskew FIFO buffers. The deskew control module derives a scrambler seed signal from an idle period data of the Ethernet PHY signals transmitted through a first one of the duplex channels, determines expected values of the idle period data of the Ethernet PHY signals of the second one and the third one according to the scrambler seed signal of the first one, and compares the expected values with the true idle period data of the second one and the third one to determine location adjustments of the read points of the FIFO buffers of the second one and the third one. The read points of the deskew FIFO buffers of the second one and the third one in the deskew FIFO module are then changed according to the location adjustments until the Ethernet PHY signals of the duplex channels read from the deskew FIFO buffers through the read points are successfully deskewed.

16 Claims, 9 Drawing Sheets

APPARATUS AND METHOD FOR DESKEWING 1000 BASE-T ETHERNET PHYSICAL LAYER SIGNALS

BACKGROUND OF THE INVENTION

1. Field of the Invention

The invention relates to Ethernet, and more particularly to 1000 BASE-T Ethernet signals.

2. Description of the Related Art

1000 BASE-T is one implementation of Gigabit Ethernet, a computer network that transmits data at a nominal speed of 1 gigabit per second. It can use Cat (Category) 5 cable, Cat 5e (Category 5 enhanced) cable, and Cat 6 cable. The cable contains four twisted copper wire pairs, through all of which the Gigabit Ethernet physical layer signals are simultaneously transmitted.

Because the Ethernet physical layer (PHY) signals transmitted through four duplex channels may suffer from different delays, Ethernet PHY signals transmitted at one time may be received by a receiver at different times, an effect known as "signal skew" or "signal misalignment". According to the IEEE 802.3ab standard for Gigabit Ethernet, there may be no more than 50 ns signal skew between the Ethernet PHY signals transmitted on the four duplex channels, or the signal misalignment between the four duplex channels may be at most 7 symbols. The signal skew, however, must be eliminated before the Ethernet PHY signals are decoded by a Viterbi decoder, which only decodes contemporary signal symbols. A method for deskewing Ethernet physical layer signals is therefore required.

BRIEF SUMMARY OF THE INVENTION

The invention provides an Ethernet physical layer receiver. The Ethernet physical layer receiver receives Ethernet physical layer (PHY) signals simultaneously transmitted through four duplex channels of a cable. The Ethernet physical layer receiver comprises a deskew first-in first-out (FIFO) module and a deskew control module. The deskew FIFO module includes four deskew FIFO buffers respectively storing the Ethernet PHY signals of the duplex channels, wherein the Ethernet PHY signals of the duplex channels are respectively retrieved from the deskew FIFO buffers for further processing through read points of the deskew FIFO buffers. The deskew control module derives a scrambler seed signal from an idle period data of the Ethernet PHY signal of the first duplex channel, determines expected values of the idle period data of the Ethernet PHY signals of the second, third, and fourth duplex channels according to the scrambler seed signal of the first duplex channel, and compares the expected values with the true idle period data of the second, third, and fourth duplex channels to determine location adjustments of the read points of the FIFO buffers of the second, third, and fourth duplex channels. The read points of the deskew FIFO buffers of the second, third, and fourth duplex channels in the deskew FIFO module are then changed according to the location adjustments until the Ethernet PHY signals of the duplex channels read from the deskew FIFO buffers through the read points are successfully deskewed.

The invention provides a method for deskewing Ethernet physical layer (PHY) signals. The Ethernet PHY signals are simultaneously transmitted through four duplex channels. First, the Ethernet PHY signals of the four duplex channels are temporarily stored in four First-In First-Out (FIFO) buffers. The Ethernet PHY signals of the four duplex channels are then retrieved from the FIFO buffers for further processing through read points of the FIFO buffers. A scrambler seed signal is then derived from an idle period data of the Ethernet PHY signal of the first wire pair. Expected values of the idle period data of the Ethernet PHY signals of the second, third, and fourth duplex channels are then determined according to the scrambler seed signal of the first wire pair. The expected values are then compared with the true idle period data of the second, third, and fourth duplex channels to determine location adjustments of the read points of the FIFO buffers of the second, third, and fourth duplex channels. The read points of the FIFO buffers of the second, third, and fourth duplex channels are then changed according to the location adjustments. The read points of the FIFO buffers are changed until the Ethernet PHY signals of the duplex channels read from the deskew FIFO buffers through the read points are successfully deskewed.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
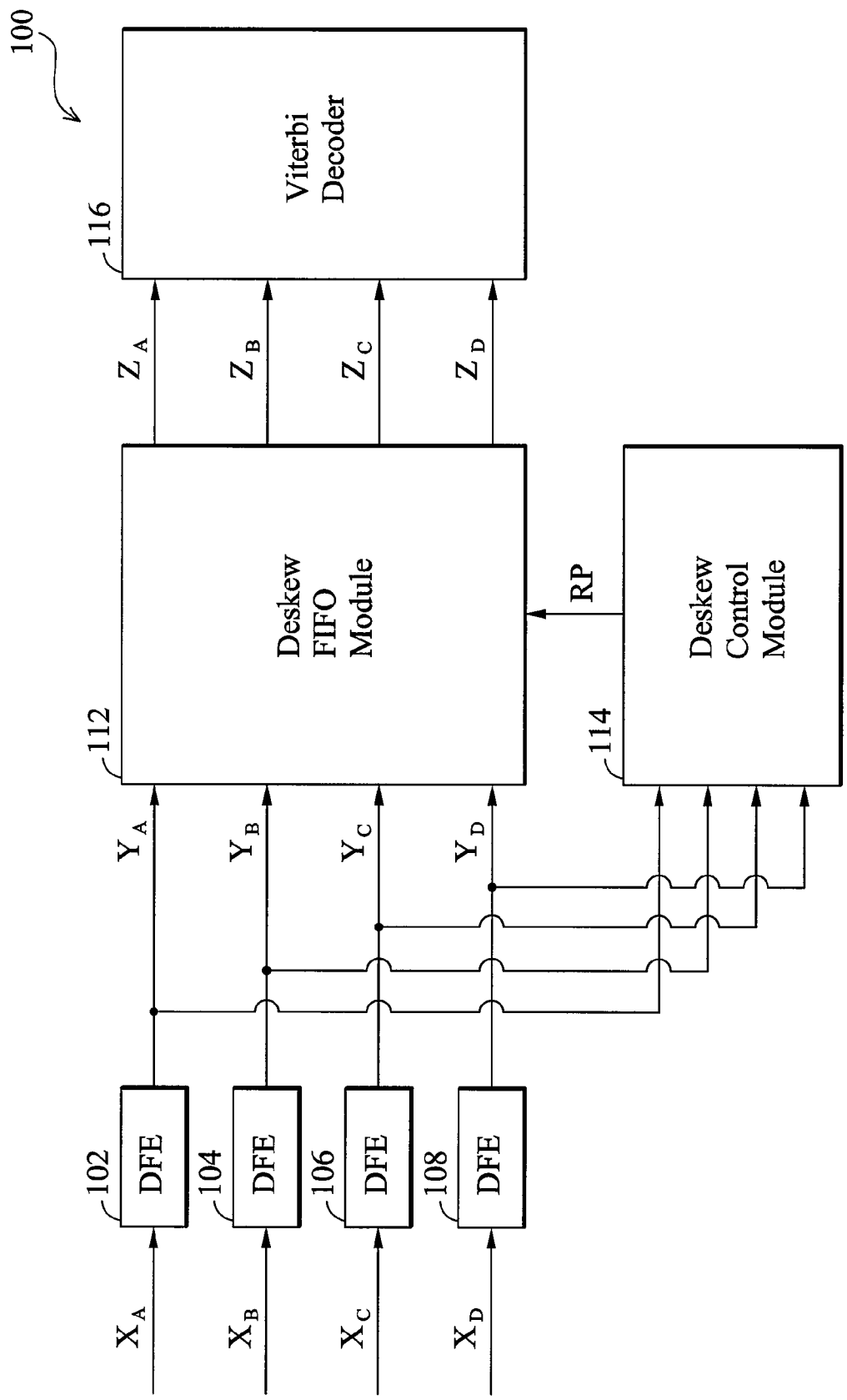
FIG. 1 is a block diagram of a Ethernet physical layer receiver according to the invention.

FIG. 1 is a block diagram of a Ethernet physical layer receiver 100 according to the invention. The Ethernet physical layer receiver 100 includes four decision feedback equalizers (DFE) 102, 104, 106 and 108, a deskew FIFO module 112, a deskew control module 114, and a Viterbi decoder 116. Signals $X_A$~$X_D$ are the Ethernet PHY signals received respectively through the four duplex channels. The duplex channels include a first, second, third, and fourth duplex channels. Because the signals $X_A$~$X_D$ may suffer from channel distortion during the transmission, the signals $X_A$~$X_D$ are respectively compensated by the DFE 102~108 to obtain signals $Y_A$~$Y_D$. The signals $Y_A$~$Y_D$, however, still suffer from signal skew, and require to be deskewed before further processed by the Viterbi decoder 116. Thus, the signals $Y_A$~$Y_D$ are first temporarily held by the deskew first-in first-out (FIFO) module 112, waiting to be deskewed before further processing.

Figure 2:
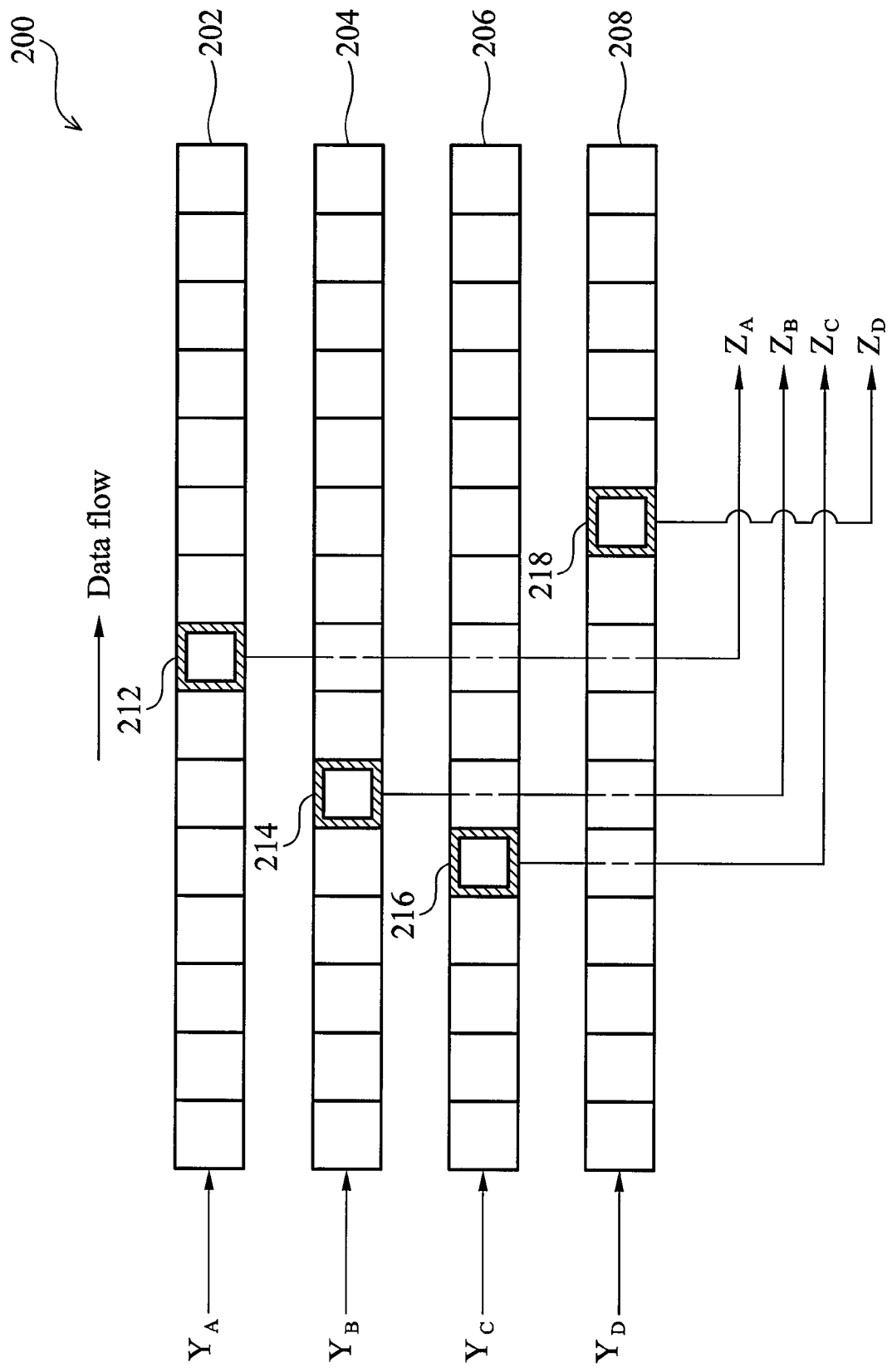
FIG. 2 is a schematic diagram of a FIFO module which can be used to implement the deskew FIFO module of FIG. 1.

The deskew FIFO module 112 includes four deskew FIFO buffers which respectively house signals $Y_A \sim Y_D$. FIG. 2 is a schematic diagram of a FIFO module 200, which can be used to implement deskew FIFO module 112. The signals $Y_A \sim Y_D$ are first respectively stored in the deskew FIFO buffers 202, 204, 206 and 208. Each deskew FIFO buffer comprises multiple delay cells for holding samples of the signals $Y_A \sim Y_D$. If the signals $Y_B$ and $Y_C$ respectively lag behind the signal $Y_A$ by two and three samples, and the signal $Y_D$ precedes the signal $Y_A$ by two samples, the signals $Y_A \sim Y_D$ can be respectively retrieved from the delay cells 212, 214, 216 and 218 to obtain the deskewed signals $Z_A \sim Z_D$ for further processing. Since the sequences of the samples stored in the delay cells 214, 216 and 218 respectively differ from the sequence of the sample stored in the delay cells 212 by −2, −3 and +2, the signal skew between the signals $Z_A \sim Z_D$ is eliminated. Because the samples stored in the delay cells of the FIFO buffers 202~208 are shifted every time a new sample is received, the signals $Y_A \sim Y_D$ stored in the deskew FIFO module 200 are thus continuously transformed to the deskewed signals $Z_A \sim Z_D$. The deskewed signals $Z_A \sim Z_D$ are then fed to the Viterbi decoder 116 for decoding.

The delay cells 212, 214, 216 and 218 from which the deskewed signals $Z_A \sim Z_D$ stored in the FIFO buffers are read are called "read points". The read points should be carefully selected to accurately eliminate the signal skew. The location of the read points of the deskew FIFO module 112 is determined by a deskew control module 114. The deskew control module 114 generates a location adjustment signal RP of the read points, and the deskew FIFO module 112 changes the read points of the deskew FIFO buffers 202~208 according to the location adjustment signal RP.

Figure 3:
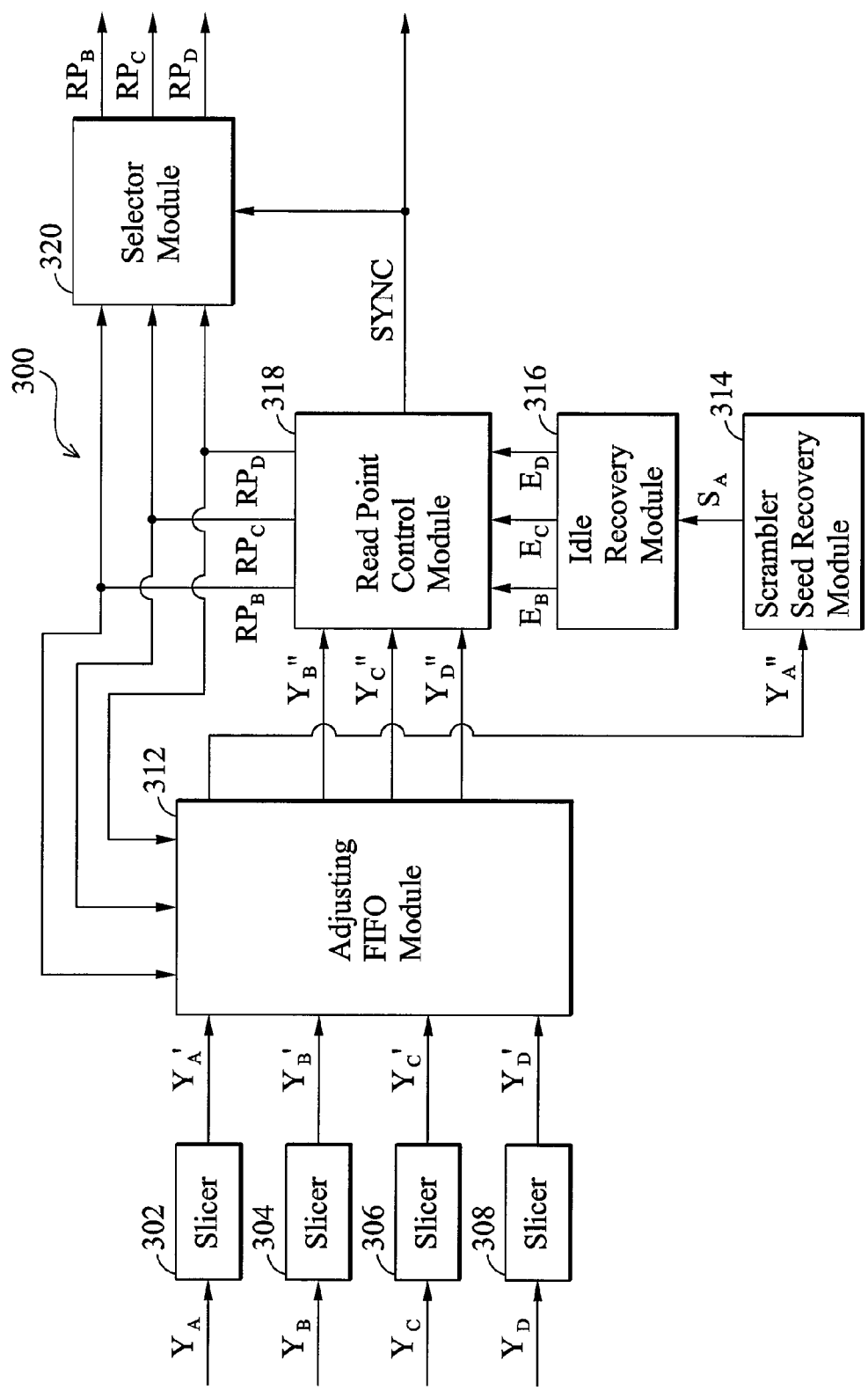
FIG. 3 is a block diagram of a deskew control module according to the invention.

FIG. 3 is a block diagram of a deskew control module 300 according to the invention. The deskew control module 300 includes four slicers 302~308, an adjusting FIFO module 312, a scrambler seed recovery module 314, an idle recovery module 316, a read point control module 318, and a selector module 320. Because the signals $Y_A \sim Y_D$ output by DFE 102~108 are multi-bit digital signals, the signals $Y_A \sim Y_D$ are first quantized by the slicers 302~308 to obtain the signals $Y_A' \sim Y_D'$, which have only the values of −1, −0.5, 0, 0.5, and 1. The signals $Y_A' \sim Y_D'$ are then temporarily stored in the four FIFO buffers of the adjusting FIFO module 312, a duplicate of the deskew FIFO module 112, as shown in FIG. 2. The function of the adjusting FIFO module 312 is identical to the deskew FIFO module 112, and the location adjustments of the read points are first tested with the adjusting FIFO module 312 before final output to the deskew FIFO module 112.

In the adjusting FIFO module 312, the read point 212 of the FIFO buffer storing the signal $Y_A'$ of the first duplex channel is set to a fixed reference point, from which the signal $Y_A'$ is read to obtain the signal $Y_A''$. The location of the read points 214, 216 and 218 of the FIFO buffers storing the signals $Y_B'$, $Y_C'$ and $Y_D'$ of the second, third, and fourth duplex channels in the adjusting FIFO module 312 are first set to default values to generate signals $Y_B''$, $Y_C''$ and $Y_D''$. The signal $Y_A''$ is first delivered to the scrambler seed recovery module 314, which derives a scrambler seed signal $S_A$ from the idle period data of the signal $Y_A''$. The idle recovery module 316 then determines the expected values $E_B$, $E_C$ and $E_D$ of the idle period data of the signals $Y_B''$, $Y_C''$ and $Y_D''$ according to the scrambler seed signal $S_A$. The read point control module 318 then compares the true idle period data of the signals $Y_B''$, $Y_C''$ and $Y_D''$ with the expected values $E_B$, $E_C$ and $E_D$. If the expected values $E_B$, $E_C$ and $E_D$ are not similar to the true idle period data of the signals $Y_B''$, $Y_C''$ and $Y_D''$, signal deskew occurs between the signals $Y_A''$, $Y_B''$, $Y_C''$ and $Y_D''$, and the read points in the adjusting FIFO module 312 must be adjusted. Thus, the read point control module 318 determines the location adjustments $RP_B$, $RP_C$ and $RP_D$ of the read points of the FIFO buffers storing the signals $Y_B''$, $Y_C''$ and $Y_D''$.

The adjusting FIFO buffer 312 then changes read points therein according to the location adjustments $RP_B$, $RP_C$ and $RP_D$. After new signals $Y_B''$, $Y_C''$ and $Y_D''$, changed according to the location adjustments $RP_B$, $RP_C$ and $RP_D$, are generated, the read point control module 318 compares the expectations $E_B$, $E_C$ and $E_D$ with the new signals $Y_B''$, $Y_C''$ and $Y_D''$ again to verify whether the signals $Y_B''$, $Y_C''$ and $Y_D''$ have been successfully deskewed. If the expected values $E_B$, $E_C$ and $E_D$ substantially equal the true idle period data of the signals $Y_B''$, $Y_C''$ and $Y_D''$, no signal deskew occurs between the signals $Y_A''$, $Y_B''$, $Y_C''$ and $Y_D''$, and the read points in the adjusting FIFO module 312 are accurate. The read point control module 318 then generates a synchronicity signal SYNC to indicate the success of deskewing. The selector module 320 triggered by the synchronicity signal SYNC then passes the location adjustments $RP_B$, $RP_C$ and $RP_D$ to the deskew FIFO module 112, and the deskewed signals $Z_A \sim Z_D$ are generated. The scrambler seed recovery module 314 is described in further detail in FIGS. 5 and 6. The read point control module 318 is described in further detail in FIGS. 7, 8 and 9.

Figure 4:
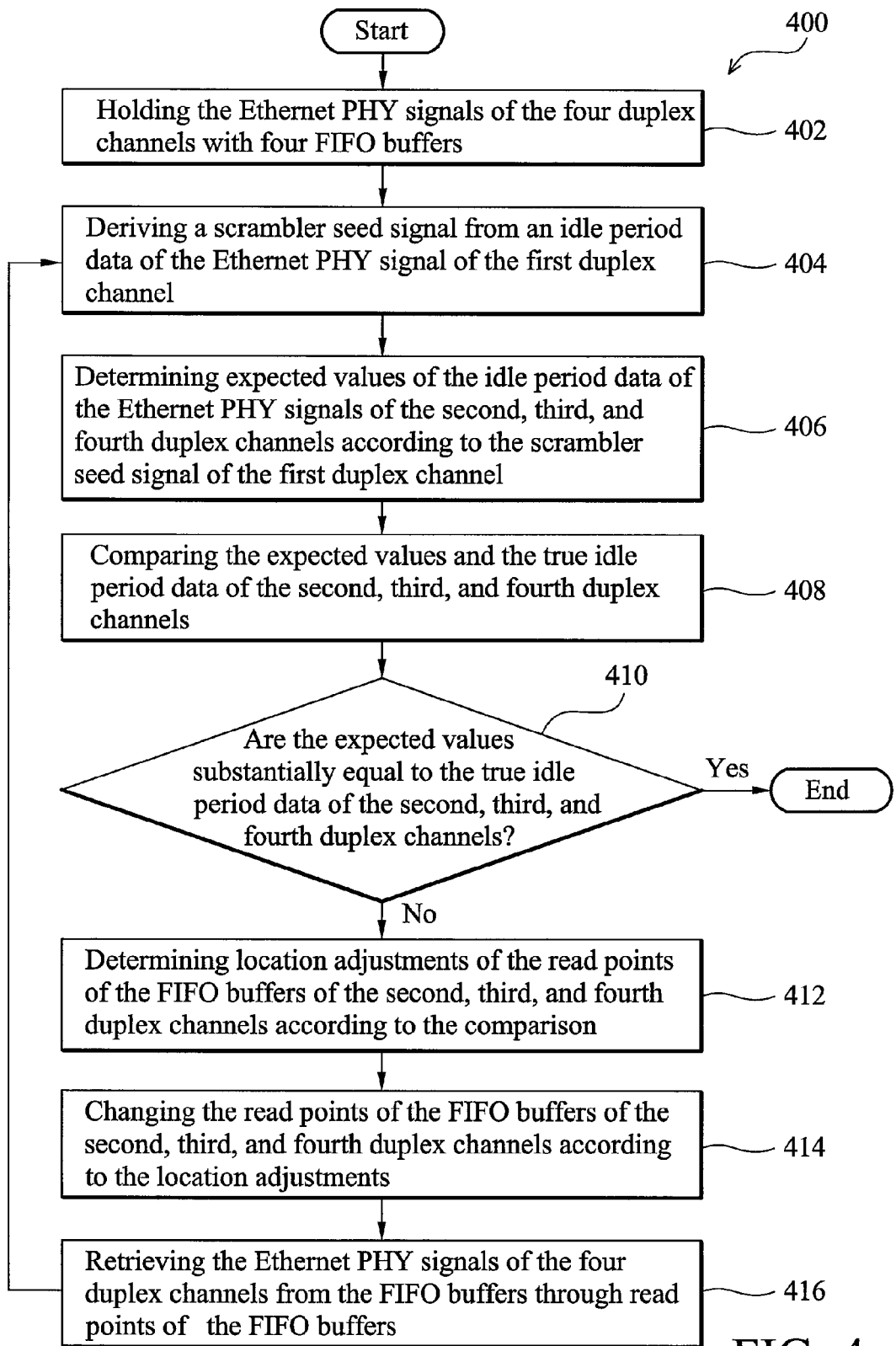
FIG. 4 is a flowchart of a method for deskewing Ethernet physical layer signals according to the invention.

FIG. 4 is a flowchart of a method 400 for deskewing Ethernet physical layer signals according to the invention. First, the Ethernet PHY signals of the four duplex channels are housed in four FIFO buffers in step 402. A scrambler seed signal is then derived from an idle period data of the Ethernet PHY signal of the first duplex channel in step 404. And then, in step 406 the expected values of the idle period data of the Ethernet PHY signals of the second, third, and fourth duplex channels are then determined according to the real-time generated scrambler seed signal from the first duplex channel.

The expected values are then compared with the true idle period data of the second, third, and fourth duplex channels in step 408. If the expected values substantially equal the true idle period data of the second, third, and fourth duplex channels in step 410, no signal skew is present between the Ethernet PHY signals, and the current locations of the read points of the FIFO buffers are accurate. Otherwise, signal skew exists between the Ethernet PHY signals, and the read points of the FIFO buffers require changing. The location adjustments of the read points of the FIFO buffers of the second, third, and fourth duplex channels are then determined in step 412, and the read points of the FIFO buffers of the second, third, and fourth duplex channels are changed according to the location adjustments in step 414. The location adjustments of the read points continue until no skew occurs between the Ethernet PHY signals. At last, the Ethernet PHY signals of the four duplex channels are then retrieved from the FIFO buffers through the read points of the FIFO buffers in step 416.

Figure 5:
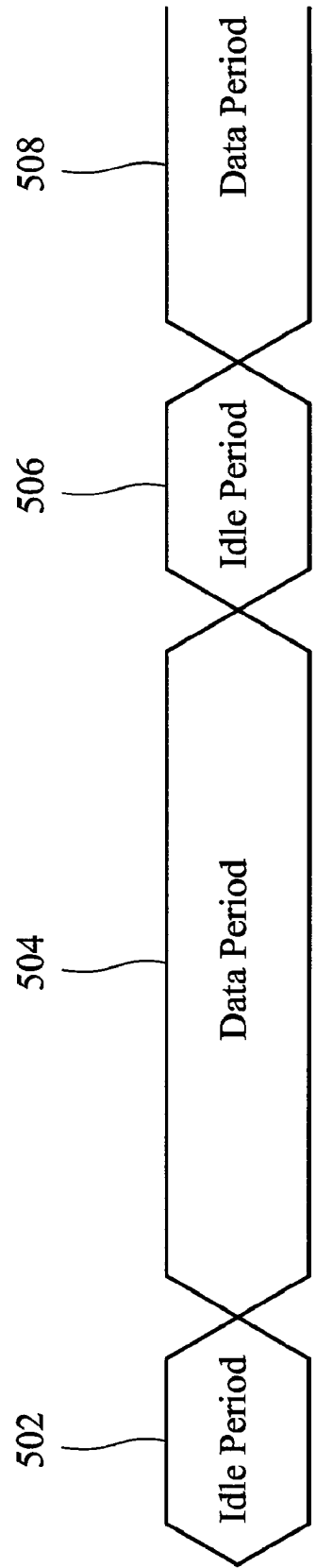
FIG. 5 shows an example of the signal frame of the Ethernet physical layer signals transmitted through one of the four duplex channels.

FIG. 5 shows an example of a signal frame of the Ethernet physical layer signals transmitted through one of the four duplex channels. The signal frame includes a data period and an idle period. Real data is only transmitted during the data period, such as the data periods 504 and 508 of FIG. 5. The idle period of the first duplex channel is used to transmit the seed of a side-stream scrambler of the remote transmitter. The data transmitted during the idle period of the second, third, and fourth duplex channels is encoded according to the scrambler seed. Thus, after the scrambler seed is derived from the Ethernet PHY signal of the first duplex channel, the expectations of the Ethernet PHY signals of the other three duplex channels can be determined according to the scrambler seed of the first duplex channel.

Figure 6:
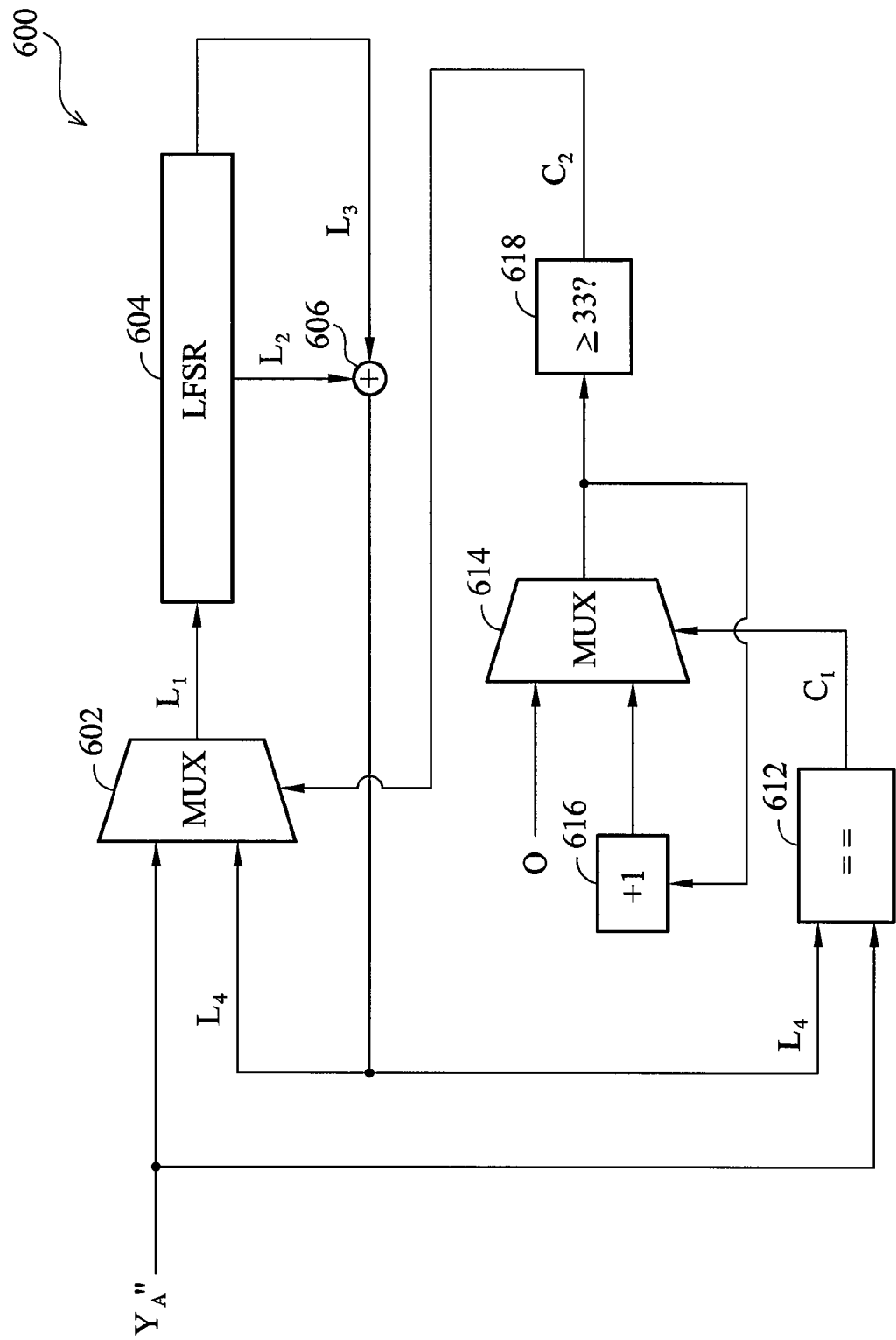
FIG. 6 is a block diagram of a scrambler seed recovery module according to the invention.

FIG. 6 is a block diagram of a scrambler seed recovery module 600 according to the invention. The idle period data of the signal $Y_A"$ of the first duplex channel is first checked whether to equal 1 or −1 and delivered to a linear feedback shift register (LFSR) 604, which holds and cyclically shifts 33 samples of the idle period data of the signal $Y_A"$. The 20th (or 13th) and 33rd samples $L_2$ and $L_3$ stored in the linear feedback shift register 604 are then exclusive-or by the XOR 606 to obtain $L_4$. $L_4$ is then compared with the idle period data of the signal $Y_A"$ by the comparator 612. If $L_4$ is equal to the idle period data of the signal $Y_A"$, the multiplexer 614 is triggered to increment the counter 616. A comparator 618 then detects whether the count number stored in the counter 616 exceeds 33. If so, the idle period data stored in the linear feedback shift register 604 is the scrambler seed signal, and the multiplexer 602 is triggered to block the signal $Y_A"$ and feed back the sum $L_4$ to the linear feedback shift register 604. Thus, the scrambler seed signal is derived and delivered to the idle recovery module 316 to calculate the expectations of the idle period data of the signals $Y_B"$, $Y_C"$ and $Y_D"$.

Figure 7:
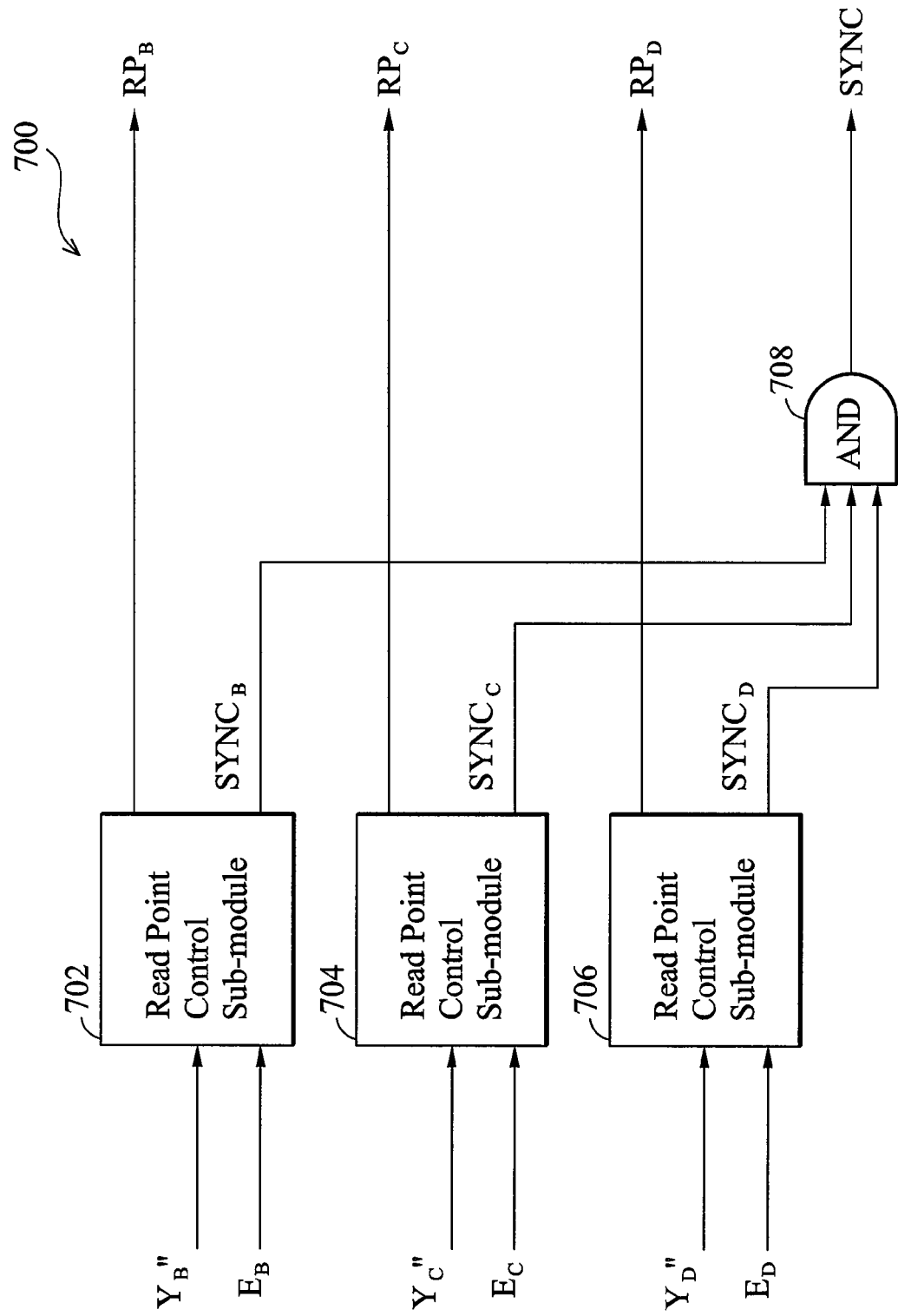
FIG. 7 is a block diagram of the read point control module according to the invention.

FIG. 7 is a block diagram of the read point control module 700 according to the invention. The read point control module 700 includes three identical sub-modules 702, 704 and 706, each of which is responsible for comparing an Ethernet PHY signal with the corresponding expected value to determine a location adjustment of the corresponding read point. The comparison reflects the occurrence of skew between the Ethernet PHY signal read from the current read point and the Ethernet PHY signal of the first duplex channel. By determining whether the number of the Ethernet PHY signal samples agreeing with the expected values exceeds a predetermined threshold, the read point control sub-modules 702, 704 and 706 verify the occurrence of signal skew. If so, a sub-synchronicity signal is generated by the sub-module to indicate that the current read point requires no more adjustment. Otherwise, the read point requires changing. If all of the sub-synchronicity signals of the read point sub-modules are generated, all read points of the second, third, and fourth duplex channels are accurate, and the synchronicity signal is enabled.

Figure 8:
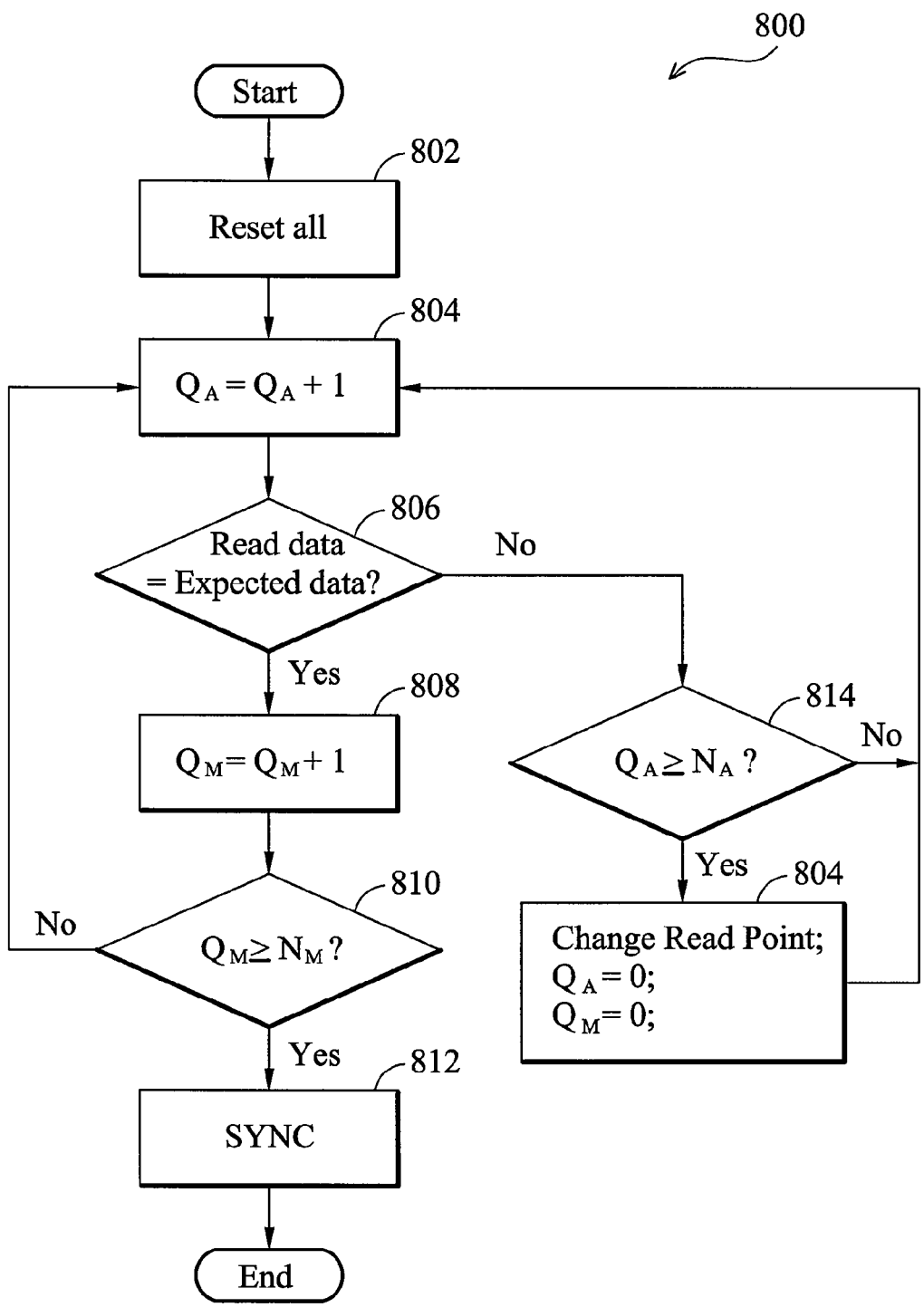
FIG. 8 is a method for determining whether to adjust the location of the read points according to the invention.

FIG. 8 shows a method 800 for determining the need for adjustment of location of the read points according to the invention. All three of the read point control sub-modules 702~706 implement the method 800 to determine the location adjustment signals $RP_B$~$RP_D$. Signal $Y_B"$ and expectation signal $E_B$ are used here as examples. Two accumulation values $Q_A$ and $Q_M$ are counted in method 800. The accumulation value $Q_A$ counts the number of the samples received, and the accumulation value $Q_M$ counts the number of samples agreeing with the expected values. A predetermined value $N_A$ defines the total number of samples counted, and a predetermined value $N_M$ defines the threshold of $Q_M$ that is less than $Q_A$.

Accumulation values $Q_A$ and $Q_M$ are cleared in step 802. Every time a sample of the idle period data of the signal $Y_B"$ is received, the accumulation value $Q_A$ is incremented in step 804. Every time a sample of the idle period data of the signal $Y_B"$ agrees with the expectation signal $E_B$ in step 806, the accumulation value $Q_M$ is incremented in step 808. If the accumulation value $Q_M$ exceeds a threshold value $N_M$ in step 810, there are more than $N_M$ samples which agree with the expected values in a total of successive $N_A$ samples in step 810, and the sub-synchronicity signal $SYNC_B$ corresponding to the second duplex channel is generated in step 812. Otherwise, if the accumulation value $Q_A$ exceeds a threshold value $N_A$ in step 814, the signal $Y_B"$ does not equal expectation $E_B$, and the location adjustment signal $RP_B$ is generated to shift the read point in step 804. According to the location adjustment signal $RP_B$, the signal $Y_B"$ is then retrieved from another delay cell of the FIFO buffer of the adjusting FIFO module 312.

Figure 9:
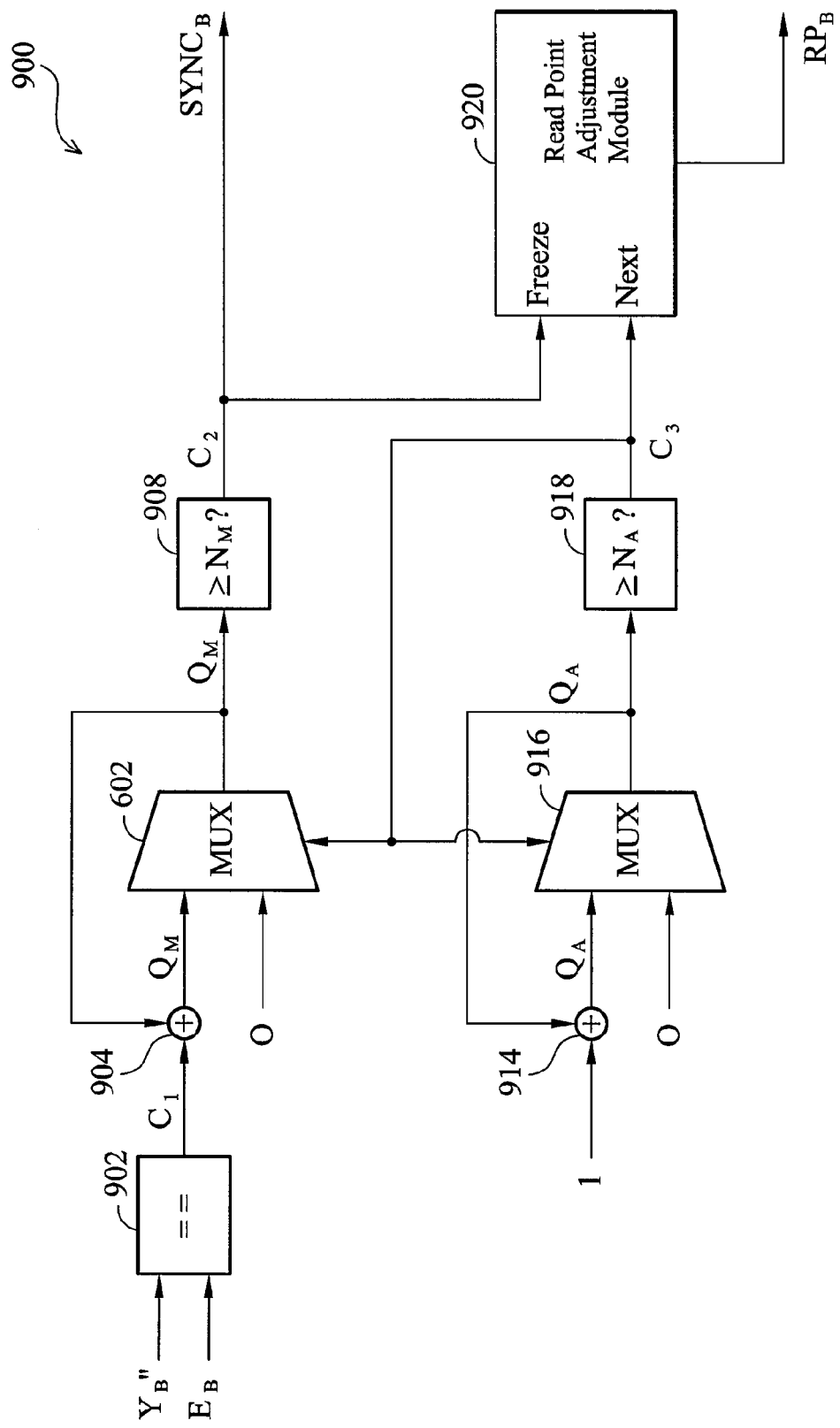
FIG. 9 is a block diagram of a read point control sub-module according to the invention.

FIG. 9 is a block diagram of a read point control sub-module 900 according to the invention. The read point control sub-module 900 implements method 800 to determine whether to adjust the location of the read point. Signal $Y_B"$ and expectation signal $E_B$ are used here as examples. A counter 914 increments an accumulation value $Q_A$ every time the read point control sub-module 900 receives a sample of the idle period data of signal $Y_B"$. A comparator 902 compares a sample of the idle period data of the signal $Y_B"$ with the expectation $E_B$ to trigger a counter 904 to increment an accumulation value $Q_M$ if a sample of the idle period data of the signal $Y_B"$ agrees with the expectation $E_B$. A comparator 908 generates a sub-synchronicity signal $SYNC_B$ if the accumulation value $Q_M$ is detected as exceeding a predetermined threshold $N_M$. Commensurately, a read point adjustment module 920 freezes the read point corresponding to signal $Y_B"$ if the sub-synchronicity signal $SYNC_B$ is enabled. A comparator 918 triggers the read point adjustment module 920 to generate the location adjustment $RP_B$ to shift the read point corresponding to signal $Y_B"$ if the accumulation value $Q_A$ is detected as exceeding a predetermined threshold $N_A$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An Ethernet physical layer receiver for receiving a plurality of Ethernet physical layer (PHY) signals simultaneously transmitted through a plurality of duplex channels, the Ethernet physical layer receiver comprising:
   a deskew first-in first-out (FIFO) module, including a plurality of deskew FIFO buffers, for respectively holding the Ethernet PHY signals of the duplex channels, wherein the Ethernet PHY signals of the duplex channels are respectively retrieved from the deskew FIFO buffers for further processing through read points of the deskew FIFO buffers;
   a deskew control module, coupled to the deskew FIFO module, for deriving a scrambler seed signal from an idle period data of the Ethernet PHY signals transmitted through a first one of the duplex channels, determining expected values of the idle period data of the Ethernet PHY signals transmitted through a second one and a third one of the duplex channels according to the scrambler seed signal of the first one, and comparing the expected values with the true idle period data of the second one and the third one to determine location adjustments of the read points of the deskew FIFO buffers of the second one and the third one;
   wherein the read points of the deskew FIFO buffers of the second one and the third one in the deskew FIFO module are changed according to the location adjustments until the Ethernet PHY signals of the duplex channels read from the deskew FIFO buffers through the read points are successfully deskewed.

2. The Ethernet physical layer receiver as claimed in claim 1, wherein the read points are the buffer cells from which the Ethernet PHY signals stored in the deskew FIFO buffers are read.

3. The Ethernet physical layer receiver as claimed in claim 1, wherein the deskew control module generates a synchronicity signal to indicate that the Ethernet PHY signals of the duplex channels read from the deskew FIFO buffers through the read points are successfully deskewed if the expected values substantially equal the true idle period data of the second one and the third one.

4. The Ethernet physical layer receiver as claimed in claim 1, the deskew control module further comprising:
 a scrambler seed recovery module for deriving the scrambler seed signal from the idle period data of the Ethernet PHY signal of the first one;
 an idle recovery module, coupled to the scrambler seed recovery module, for determining the expected values of the idle period data of the Ethernet PHY signals of the second one and the third one according to the scrambler seed signal of the first one;
 a read point control module, coupled to the idle recovery module, for comparing the true idle period data of the second one and the third one with the expected values to determine the location adjustments of the read points of the deskew FIFO buffers of the second one and the third one.

5. The Ethernet physical layer receiver as claimed in claim 4, wherein the deskew control module further comprises an adjusting FIFO module, coupled to the scrambler seed recovery module and the read point control module, for duplicating the deskew FIFO module, providing the Ethernet PHY signals for the scrambler seed recovery module and the read point control module, changing the read points therein according to the location adjustments, and the read point control module, and comparing the expectations with the Ethernet PHY signals changed according to the location adjustments to verify whether the Ethernet PHY signals are successfully deskewed.

6. The Ethernet physical layer receiver as claimed in claim 5, wherein the read point control module generates a synchronicity signal if the Ethernet PHY signals are verified to be successfully deskewed, and the deskew control module further comprises a selector module, coupled to the read point control module, for passing the location adjustments to the deskew FIFO module if triggered by the synchronicity signal.

7. The Ethernet physical layer receiver as claimed in claim 4, the read point control module further comprising:
 a plurality of read point control sub-modules for estimating a ratio of samples of the idle period data of the Ethernet PHY signals agreeing with the expected values of the second one and the third one, generating the location adjustments to shift the read points if the ratio is smaller than a predetermined threshold ratio, and providing sub-synchronicity signals if the ratio exceeds the predetermined threshold ratio; and
 an AND gate, coupled to the read point control sub-modules, for enabling a synchronicity signal after all of the sub-synchronicity signals of the read point sub-modules are generated.

8. The Ethernet physical layer receiver as claimed in claim 7, wherein each of the read point control sub-modules further comprises:
 a first counter for incrementing a first accumulation value if the read point control sub-modules receive one sample of the idle period data of the second one and the third one;
 a first comparator for comparing one sample of the idle period data of the second one and the third one with the expectations;
 a second counter, coupled to the first comparator, for incrementing a second accumulation value if one sample of the idle period data of the second one and the third one agrees with the expectations;
 a second comparator, coupled to the first counter, for detecting whether the first accumulation value exceeds a first predetermined threshold;
 a third comparator, coupled to the second counter, for generating the sub-synchronicity signals if the second accumulation value is detected as exceeding a second predetermined threshold; and
 a read point adjustment module, coupled to the second comparator, for generating location adjustments to shift the read points if the first accumulation value exceeds the first predetermined threshold;
 wherein the second predetermined value is smaller than the first predetermined value, the ratio is the quotient of the second and first accumulation values, and the predetermined threshold ratio is the quotient of the second and first predetermined values.

9. The Ethernet physical layer receiver as claimed in claim 4, wherein the scrambler seed recovery module further comprises:
 a linear feedback shift register for holding and cyclically shifting 33 samples of the idle period data of the first one;
 an adder, coupled to the linear feedback shift register for adding the 20th and 33rd samples stored in the linear feedback shift register to obtain a sum;
 a first comparator, coupled to the adder, for detecting whether the sum is equal to the idle period data of the first one;
 a counter, coupled to the first comparator, for incrementing a count number if the sum is equal to the idle period data of the first one; and
 a second comparator, coupled to the first comparator, for detecting whether the count number exceeds 33;
 wherein the idle period data stored in the linear feedback shift register is the scrambler seed signal if the count number exceeds 33.

10. The Ethernet physical layer receiver as claimed in claim 1, wherein the Ethernet physical layer receiver further includes a Viterbi decoder, coupled to the deskew FIFO module, decoding the Ethernet PHY signals of the duplex channels after the Ethernet PHY signals of the duplex channels are successfully deskewed.

11. A method for deskewing a plurality of Ethernet physical layer (PHY) signals, wherein the Ethernet PHY signals are simultaneously transmitted through a plurality of duplex channels, the method comprising:
 holding the Ethernet PHY signals of the duplex channels with a plurality of First-In First-Out (FIFO) buffers;
 deriving a scrambler seed signal from an idle period data of the Ethernet PHY signals transmitted through a first one of the duplex channels;
 determining expected values of the idle period data of the Ethernet PHY signals of a second one and a third one of the duplex channels according to the scrambler seed signal of the first one;
 comparing the expected values with the true idle period data of the second one and the third one to determine location adjustments of the read points of the FIFO buffers of the second one and the third one; and changing the read points of the FIFO buffers of the second one and the third one according to the location adjustments;

wherein the read points of the FIFO buffers are changed until the Ethernet PHY signals of the duplex channels read from the FIFO buffers through the read points are successfully deskewed.

12. The method as claimed in claim 11, wherein the read points are the buffer cells from which the Ethernet PHY signals stored in the FIFO buffers are read.

13. The method as claimed in claim 11, wherein the method further comprises confirming that the Ethernet PHY signals are successfully deskewed if the expected values substantially equal the true idle period data of the second one and the third one.

14. The method as claimed in claim 11, wherein the determination of the location adjustments further comprises:

incrementing a first accumulation value if one sample of the idle period data of the second one and the third one is received;

incrementing a second accumulation value if one sample of the idle period data of the second one and the third one agrees with the expectations;

generating the location adjustments to shift the read points if the first accumulation value exceeds a first predetermined threshold; and confirming that Ethernet PHY signals are successfully deskewed if the second accumulation value exceeds a second predetermined threshold before the first accumulation value exceeds the first predetermined threshold;

wherein the second predetermined value is smaller than the first predetermined value.

15. The method as claimed in claim 11, wherein the derivation of the scrambler seed signal further comprises:

holding and cyclically shifting 33 samples of the idle period data of the first one with a linear feedback shift register;

adding the 20th and 33th samples stored in the linear feedback shift register to obtain a sum; and incrementing a count number if the sum is equal to the idle period data of the first one;

wherein the idle period data stored in the linear feedback shift register is the scrambler seed signal if the count number exceeds 33.

16. The method as claimed in claim 11, wherein the Ethernet PHY signals of the duplex channels are further decoded by a Viterbi decoder after the Ethernet PHY signals of the duplex channels are successfully deskewed.

* * * * *